(12) United States Patent
Nation et al.

(10) Patent No.: US 9,860,694 B2
(45) Date of Patent: Jan. 2, 2018

(54) COMPUTING PLATFORM METHOD AND APPARATUS FOR TRANSMITTING DATA COMMUNICATION VIA RADIO ACCESS POINT

(71) Applicant: The United States of America as represented by the Secretary of the Navy, Washington, DC (US)

(72) Inventors: Jeremy Nation, Bloomington, IN (US); Michael F. Hardy, Bloomfield, IN (US); Keith Buck, Bloomfield, IN (US); Mathew Hardman, Mitchell, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/453,319

(22) Filed: Mar. 8, 2017

(65) Prior Publication Data
US 2017/0265031 A1    Sep. 14, 2017

Related U.S. Application Data

(60) Provisional application No. 62/305,186, filed on Mar. 8, 2016.

(51) Int. Cl.
*H04W 24/00* (2009.01)
*H04W 4/02* (2009.01)
*H04W 4/00* (2009.01)

(52) U.S. Cl.
CPC .............. *H04W 4/02* (2013.01); *H04W 4/008* (2013.01)

(58) Field of Classification Search
CPC ................................ H04W 4/02; H04W 4/008
(Continued)

(56) References Cited

U.S. PATENT DOCUMENTS 8,213,957 B2    7/2012  Bull et al.
8,442,482 B2 *  5/2013  Maier .................... H04W 64/00
                                                    455/404.1
(Continued)

FOREIGN PATENT DOCUMENTS

CN         1702301 A      11/2005

OTHER PUBLICATIONS

Bulusu, Nirupama et al., Scalable, Ad Hoc Deployable RF-based Localization; Retrieved from the Internet on Nov. 16, 2015 (Nov. 16, 2015); available at URL: http://www.isi.edu/div7/publication_files/scalable_ad_hoc.pdf;5 pages.

(Continued)

*Primary Examiner* — Amancio Gonzalez
(74) *Attorney, Agent, or Firm* — Christopher A. Monsey (57) ABSTRACT

A computing platform, comprising at least one computing device including a plurality of device applications; a command server disposed at a first location and configured to provide data communication to the at least one computing device by way of a radio access point and to receive data communication from the at least one computing device; a first radio device communicably coupled to the at least one computing device and the command server, the first radio device being coupled to the radio access point to enable data communication between the at least one computing device and the command server. At least one device application of the at least one computing device is configured to transmit a plurality of data including location data and at least one of image data, text data, and voice data, the location data corresponding to a location of one or more personnel positioned at a second location that is spaced apart from the first location.

27 Claims, 6 Drawing Sheets

(58) Field of Classification Search
USPC .................................................. 455/456.1
See application file for complete search history.

(56) References Cited

U.S. PATENT DOCUMENTS

| | | | | |
|---|---|---|---|---|
| 8,521,125 | B2* | 8/2013 | Collins | G06F 19/327 |
| | | | | 455/404.1 |
| 8,769,688 | B2* | 7/2014 | Geigel | G06F 11/3006 |
| | | | | 726/23 |
| 8,810,430 | B2 | 8/2014 | Proud | |
| 8,832,374 | B1 | 9/2014 | Schaefers | |
| 2008/0045236 | A1 | 2/2008 | Nahon et al. | |
| 2009/0057399 | A1 | 3/2009 | Sajkowsky | |

OTHER PUBLICATIONS

Jangra, Banta, Bluetooth—Smart Notes for Mobile Ad-hoc Networks, International Journal of Information Dissemination and Technology, Jan.-Mar. 2010, vol. 1, Issue 1; ISSN 2229-5984; Retrieved from the Internet on Nov. 16, 2015 (Nov. 16, 2015); available at URL: http://ijidt.com/index.php/ijidt/article/view/36/32; 7 pages.

Chlamtac, Imrich et al., Mobile ad hoc networking: imperatives and challenges; Ad Hoc Networks 1 (2003) 13-64; © 2003 Elsevier B.V.; Retrieved from the Internet on Nov. 16, 2015 (Nov. 16, 2015); available at URL: http://www.grc.upv.es/docencia/rinmalaga/biblio_BASICA/Mobile%20ad%20hoc%20networking%20imperatives%20and%20challenges.pdf; 52 pages.

Paul, Susmit et al., Concept of Wireless Sensor Ad-Hoc Network Focusing on Mobile Computing, ISTP Journal of Research in Electrical and Electronics Engineering (2004); © ISTP (IOCRSEM-2014); Retrieved from the Internet on Nov. 16, 2015 (Nov. 16, 2015); available at URL: http://www.istp.org.in/papers/spec_issue/iocrsem14/IOCRSEM_EC_26.pdf; 11 pages.

Bader, Roland et al., BigNurse: A Wireless Ad Hoc Network for Patient Monitoring; 1-4244-1086-X/07 © 2007 IEEE; Retrieved from the Internet on Nov. 16, 2015 (Nov. 16, 2015); available at URL: http://www.researchgate.net/publication/224704377_BigNurse_A_Wireless_Ad_Hoc_Network_for_Patent_Monitoring; 4 pages.

* cited by examiner

COMPUTING PLATFORM METHOD AND APPARATUS FOR TRANSMITTING DATA COMMUNICATION VIA RADIO ACCESS POINT

PRIORITY CLAIM

This application claims priority to U.S. provisional application Ser. No. 62/305,186 filed on 8 Mar. 2016, the entire disclosure of which is hereby expressly incorporated herein by reference.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (Navy Case 200,352) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

A variety of prior art computing devices may be utilized to provide personnel position location information ("PPLI"). Prior art methods of providing PPLI typically require the use of large computing devices with limited data through-put capability. For example, known methods for providing PPLI generally include one or more individuals using a standalone location device, such as a global positioning system ("GPS"), and periodically transmitting their coordinates by voice through a handheld radio device. The prior art method of transmitting GPS coordinates by way of a handheld radio is time consuming and may be subject to error when the user is forced to manually relay GPS coordinates and/or position information. Use of this known method may further allow for substantial error in personnel position information provided to and maintained at a command center. In certain scenarios, groups or personnel units may transition/move to multiple locations and, for one or more reasons, fail to provide updated position location information upon arrival at each location. Another, known method includes use of a location device integrated within an existing field radio device. While use of radio devices with integrated position functions may be configured to automatically send location information, use of this method requires that each team/group member carry their own field radio device. Hence, use of this known method is cost-prohibitive and would require each personnel to transport multiple pieces of heavy communication gear including, for example, back-up radio hardware, spare batteries, etc.

In one embodiment of the present disclosure a computing platform is provided, comprising at least one computing device including a plurality of device applications; a command server disposed at a first location, wherein the command server is configured to provide data communication to the at least one computing device by way of a radio access point and to receive data communication from the at least one computing device by way of the radio access point; a first radio device communicably coupled to the at least one computing device and the command server, the first radio device being coupled to the radio access point to enable data communication between the at least one computing device and the command server; and wherein at least one of the plurality of device applications enables the at least one computing device to transmit a plurality of data including at least one of image data, text data, voice data and location data, the location data corresponding to a location of one or more personnel positioned at a second location that is spaced apart from the first location; wherein the at least one device application communicates with an inertial measurement unit of the at least one computing device to provide a first inertial movement data indicating a first position of the at least one computing device relative to the first radio device and to provide a second inertial movement data in response to the computing device moving beyond a threshold distance relative to the first position, the second inertial movement data indicating a second position of the at least one computing device relative to the first radio device; wherein the location data is provided to the command server at a first time period when the one or more personnel are positioned at the second location and at a second time period when the one or more personnel are positioned at a third location that is spaced apart from the first location and the second location.

In another embodiment of the present disclosure, a computing platform is provided comprising a first computing device including a plurality of device applications, the first computing device configured to provide data communication by way of a first radio access point; a command server disposed at a first location, the command server configured to provide data communication to the first computing device by way of the first radio access point and to receive data communication provided by the first computing device; a first radio device communicably coupled to the first computing device, the first radio device being coupled to the first radio access point to enable data communication between the first computing device and the command server; a second radio device communicably coupled to the command server and the first radio device, the second radio device being disposed at the first location and configured to enable data communication between the command server and the first computing device; and wherein the first computing device couples to the first radio access point and communicates with the first radio device by way of a first communication protocol and wherein the first radio device couples to the second radio device and communicates with the second radio device by way of a second communication protocol; wherein at least one of the plurality of device applications enables the first computing device to transmit a plurality of data including location data and at least one of image data, text data, and voice data, the location data corresponding to a location of one or more personnel positioned at a second location that is spaced apart from the first location; wherein the at least one device application communicates with an inertial measurement unit of the first computing device to provide a first inertial movement data indicating a first position of the first computing device relative to the first radio device and to provide a second inertial movement data in response to the computing device moving beyond a threshold distance relative to the first position, the second inertial movement data indicating a second position of the first computing device relative to the first radio device.

In yet another embodiment of the present disclosure, a method in a computing platform is provided comprising, providing a first wireless communication link between a first computing device and at least one of a first radio device disposed at a first location and a second radio device disposed at a second location that is spaced apart from the first location; providing a second wireless communication link between a second computing device and at least one of the first radio device and second radio device; providing a third wireless communication link between a command server and at least of the first radio device and the second radio device, the command server being disposed at a third location that is spaced apart from the first and second locations; providing a first radio access point having a first access signal range limit, the first radio access point enabling data communication between the command server and at least the first computing device; providing a second radio access point having a second access signal range limit, the second signal access point enabling data communication between the command server and at least the second computing device; transmitting, by at least one of the first and second computing devices, a plurality of data to the command server, the plurality of data including location data and at least one of image data, text data, and voice data, the location data corresponding to a location of one or more personnel positioned at a fourth location that is spaced apart from the third location; coupling the first computing device to the second radio device via the second radio access point when the first computing device moves beyond the access signal range limit of the first radio access point and is within the access signal range limit of the second radio access point; and coupling the second computing device to the first radio device via the first radio access point when the second computing device moves beyond the access signal range limit of the second radio access point and is within the access signal range limit of the first radio access point.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Additional features and advantages of the present disclosure will become apparent to those skilled in the art upon consideration of the following detailed description of the illustrative embodiment exemplifying the best mode of carrying out the invention as presently perceived.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention. Further, the following description is merely exemplary in nature and is in no way intended to limit the disclosure, its application, or uses. As used herein, the phrase at least one of A, B, and C should be construed to mean a logical (A or B or C), using a non-exclusive logical OR. It should be understood that steps within a method may be executed in a different order without altering the principles of the present disclosure. As used herein, radio device, computing device and/or computing sever may refer to a component including, for example, an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 1:
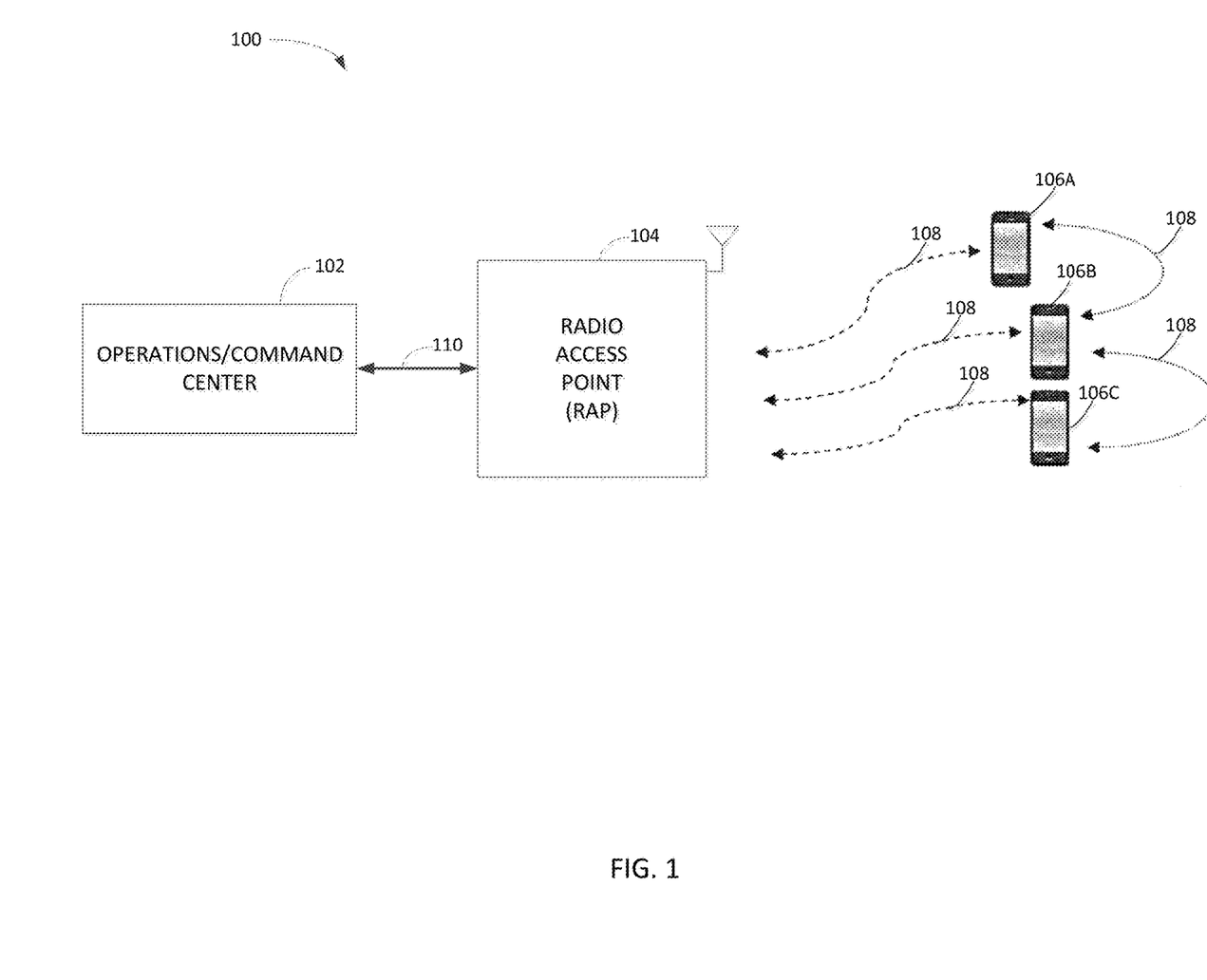
FIG. 1 is an exemplary block diagram depicting a first computing platform according to an embodiment of the present disclosure.

Referring initially to FIG. 1, an exemplary block diagram depicting a computing platform 100 is shown. Computing platform 100 (hereinafter "platform 100") generally includes operations/command center 102, radio access point 104, plurality of computing devices 106A-106C, computing device data link 108, and radio data link 110. Exemplary computing devices include conventional Android smart phones such as, for example, a Samsung and/or a Motorola smart phone. As is generally known in the art, exemplary operations centers such as command center 102, typically include a plurality of computing systems including desktop and laptop computers (not shown) as well as one or more computing/command servers generally configured to store a plurality of software applications and programs. In one embodiment, command center 102 includes at least one computing sever configured to host, for example, an enhanced battlespace reconnaissance, intelligence and surveillance software (EBRISS) application. In this embodiment, the EBRISS and other software applications resident within the computing server enable systems within command center 102 to engage in data communications with one or more personnel at a location that is different from and spaced apart from the location of command center 102. In one embodiment, command center 102 includes a sophisticated Command, Control, Communications & Computers (C4) Information, Surveillance and Reconnaissance (ISR) (C4ISR) system that integrates myriad of third party sensors and systems for a common control and display via one or more graphical user interfaces (GUIs) disposed within command center 102.

As described in more detail in the illustrative embodiment of FIG. 2 and FIG. 5, radio access point 104 (hereinafter "RAP 104") allows at least one computing device 106 to engage in data communication with one or more computing/server systems disposed in command center 102. Computing device data link 108 enables data communications and communications coupling between, for example, a first computing device 106A and a second computing device 106B by way of RAP 104. In one embodiment, data link 108 facilitates data communications between RAP 104 and computing devices 106A-106C by way of a wireless communication protocol such as, for example, the Bluetooth® wireless communication protocol. Additionally, the present disclosure contemplates that alternative communication protocols such as the Ethernet protocol and/or the IEEE 802.11 WiFi protocol may also be utilized. As shown in the illustrative embodiment of FIG. 1, RAP 104 and radio data link 110 enables data communication and communications coupling between a command server disposed within command center 102 and at least one of computing device 106A-106C.

In one embodiment, RAP 104 and radio data link 110 facilitates data communications between command center 102 and computing devices 106A-106C by way of a communication protocol such as, for example, the Transmission Control Protocol/Internet Protocol (TCP/IP). Additionally, the present disclosure contemplates that alternative communication protocols such as the Satellite Internet Protocol may also be utilized.

Figure 2:
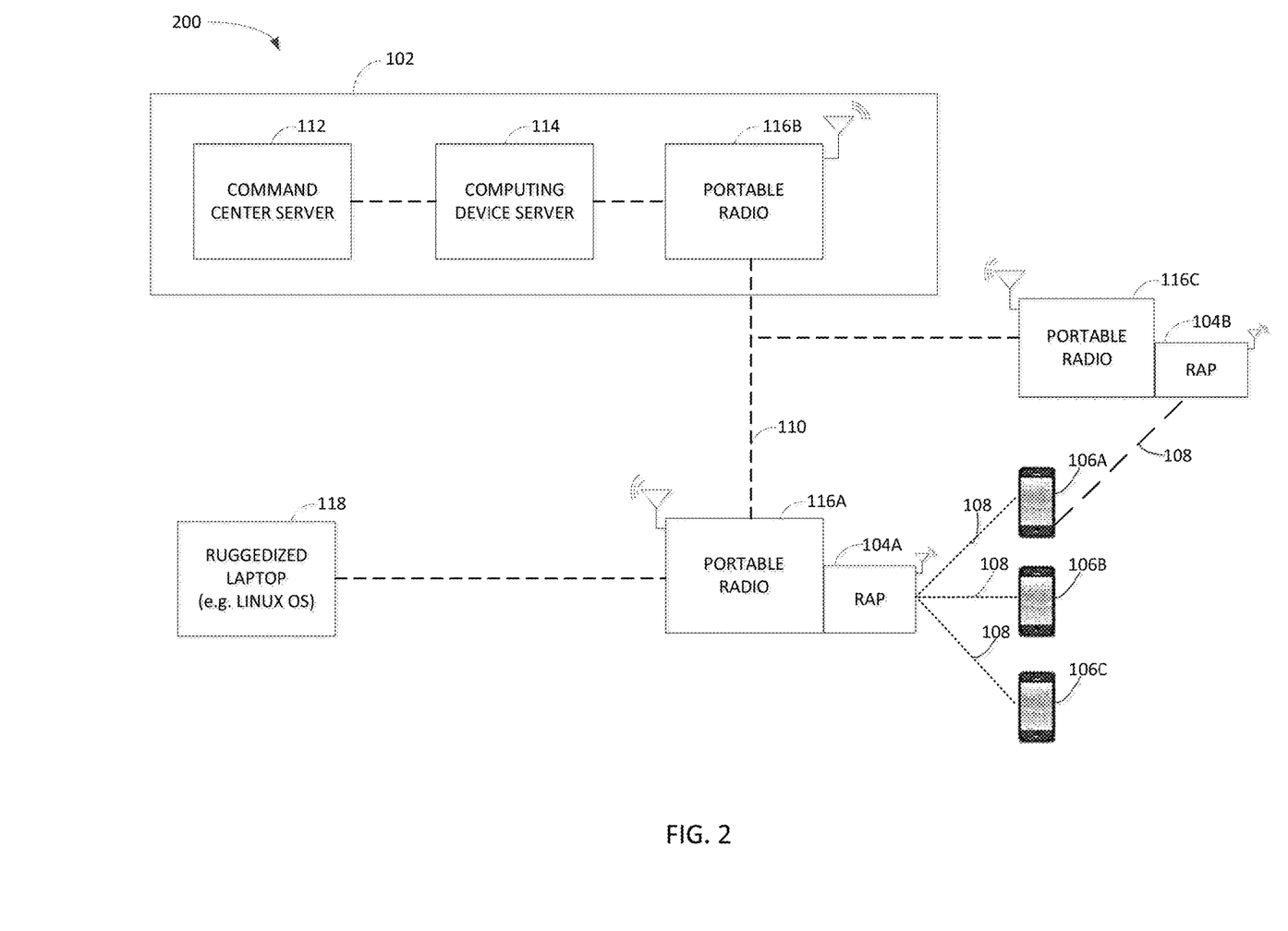
FIG. 2 is an exemplary block diagram depicting a second computing platform according to an embodiment of the present disclosure.

FIG. 2 is an exemplary block diagram depicting a computing platform 200 according to an embodiment of the present disclosure. Computing platform 200 (hereinafter "platform 200") generally includes one or more components that are the same as or substantially similar to the components described above in the disclosed embodiment of FIG. 1. Additionally, platform 200 further includes at least a first RAP 104A and a second RAP 104B, command center server 112, computing device server 114, portable radios 116A-116C, and ruggedized laptop 118. In one embodiment, ruggedized laptop 118 is a Toughbook computing device running, for example, a Linux operating system and is configured to function as a file share server providing a central file share database including digital text data, image data, voice data, and video data storage for access and sharing between one or more computing devices 106A-106C. Exemplary Toughbook computing devices include laptop computers such as the Toughbook CF-29 manufactured by Panasonic™. In various embodiments, portable radios 116A/B/C are multi-band networking man-pack radio devices and may be described as software-defined tactical radios that provide breakthrough wideband data performance and legacy narrowband interoperability in one lightweight package. In one embodiment, radios 116A/B/C cover the 30 Mega-Hertz (MHz) to 2 Giga-Hertz (GHz) frequency range, are single-channel radios that are 30% smaller and 35% lighter than presently fielded multi-band man-pack radios, and operate off a single standard battery. In one embodiment, radios 116A/B/C are each the AN/PRC-117G Multiband Networking Manpack Radio manufactured by Harris Falcon III®.

Additionally, in various alternative embodiments, radios 116A/B/C each include network capabilities enhanced with the Harris RF-7800B series of Broadband Area Global Network (BGAN) terminals which provide satellite-based wideband beyond-line-of-sight communications, automatic and secure range extension, connection to out-of-range networks, access to the Internet and remote private networks. Moreover, radios 116A/B/C may each include secure voice and data transmission with the Harris Sierra™ II software programmable encryption module configured to provide Type 1 encryption that is National Security Agency (NSA) certified up to TOP SECRET. In one embodiment and as noted above, radios 116A/B/C are each multi-mission capable with wideband and legacy narrowband interoperability as well as an internal GRAM-SAASM Global Positioning System (GPS) receiver. Each radios 116A/B/C may also include electronic circuitry that enables coupling each radio to a single RAP 104 such that computing device 106 may exchange data communications within radios 116A/B/C via the Bluetooth communication protocol.

In one embodiment, computing device 106 includes a modified Android Operating System ("OS") that enables the handheld device (e.g., smartphone) to couple to RAP 104 to securely exchange data communications with radios 116A/B/C and computing device server 114. In one aspect of this embodiment, a computing device 106, RAP 104 and a radio 116A cooperate to form a secure personal area network ("PAN"). The secure PAN utilizes a modified Bluetooth PAN that leverages E0 cryptography to connect computing device 106 to RAP 104. Through this cryptographic connection, a National Institute of Standards and Technology ("NIST") Federal Information Processing Standard ("FIPS") 140 validated Internet Protocol Security ("IPSEC") Virtual Private Network ("VPN") tunnel is deployed to provide secure connectivity for the VPN gateway. Additionally, the inherent Bluetooth pairing functionality of the Android OS is disabled or limited for computing device 106 and RAP 104 such that all pairing information is loaded as needed through a configuration application (described in more detail below). In one embodiment, the design of RAP 104 which enables the secure PAN access point capability builds upon a LogicPD™ SOM-M2 processor and memory board by adding a minimal number of peripheral interfaces on a separate daughter board (may be referred to also as a baseboard). The number of peripheral interfaces may vary based on user/design requirements. The number of peripheral interfaces sufficient to meet user requirements may be identified during a process of creating one or more Bluetooth access points in a development a prototyping environment. The peripheral interfaces support basic usability requirements for RAP 104 and computing device 106 functionality within computing platform 200.

As noted above, computing device 106 includes a modified Android Operating System ("OS") that enables secure coupling to RAP 104. In one embodiment, computing device 106 includes core software features/functions that contribute to establishing the secure PAN. In this embodiment, computing device 106 implements a minimal 802.15 protocol stack symmetric to the 802.15 protocol stack utilized within the operating environment of conventional Android devices. At the kernel level of the OS the following should be configured based on user defined requirements: 1) Bluetooth Network Encapsulation Protocol (BNEP)—Ethernet emulation layer on top of Bluetooth which is required for Bluetooth PAN (Personal Area Network); 2) Logical Link Control and Adaptation Protocol (L2CAP)—provides connection oriented and connection-less data transport; 3) HCI Universal Serial Bus (USB) driver—required for use of Bluetooth devices having a USB interface; and 4) UART/serial port—data transfer medium. Various other 802.15 protocol stacks normally included in the Android OS kernel such as RFCOMM and SCO should be removed. Similar to the 802.15 protocol configuration for computing device 106, RAP 104 will execute minimal Bluez components required to implement PAN connections. In one embodiment, RAP 104 will execute configuration scripts to facilitate a secure PAN connection between RAP 104 and computing device 106. Exemplary configuration scripts generally include scripts known to one of ordinary skill, such as, PAND, HCICONFIG, and HCIATTACH. It is important to note that, in an alternative embodiment, RAP 104 may be configured to disable running Socket Direct Protocol (SDP) even though the access point provides Network Access service. In this alternative embodiment, because SDP is not running, other Bluetooth devices will not be able to discover the RAP 104 nor can these other devices issue queries to the RAP 104 requesting Network Access service using SDP.

According to the present disclosure, command center server 112, computing device server 114, portable radios 116A-C and computing device 106 each include one or more processors that functionally execute the operations of the sever, radio and computing devices. The description herein including processors and memory may be implemented in hardware and/or as computer instructions on a non-transient computer readable storage medium, and may be distributed across various hardware or computer based components. Example and non-limiting implementation elements that functionally execute the operations of the server, radio and computing devices include electronic circuitry and antennas providing any value determined herein, electronic circuitry and antennas providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to a specification, any op-amps, analog control elements (springs, filters, integrators, adders, dividers, gain elements), and/or digital control elements.

Exemplary processors may include one or more microprocessors, microcontrollers, digital signal processors (DSPs), combinations thereof and/or such other devices known to those having ordinary skill in the art that may be configured to process one or more data and/or parameter signals to provide one or more control signals. Exemplary memory includes random access memory (RAM), dynamic random access memory (DRAM), and/or read only memory (ROM) or equivalents thereof, that store data and programs that may be executed by exemplary processor and allow one or more radio, computer servers and computing devices to communicate within one or more platform systems of the present disclosure to cause the platform systems to perform the functionality described herein. In one embodiment, at least one sector of the exemplary memory may be comprised of one or more non-volatile memory sectors that are configured to retain data while the exemplary memory is in a powered down state.

Command center server 112 and computing device server 114 may be conventional computer server devices generally known by one of ordinary skill in the art and configured/programmed to respond to user requests for data or access to one or more application programs resident within the server devices. In one embodiment, server 112 and sever 114 may each be configured to wait for and respond to requests from other computer devices or software programs and share data, hardware and/or software resources among various clients/devices or programs within, for example, platform 200. In one embodiment, command center server 112 is configured to host the aforementioned Enhanced Battlespace Reconnaissance, Intelligence and Surveillance Software (EBRISS) application. In yet another embodiment, server 112 performs low-level control of messages and data via command battle directives (CBD) and interfaces with all connected network payloads by way of one or more dedicated drivers. In one aspect of this embodiment, server 112 couples to and interfaces with a graphical user interface (hereinafter "GUI") that provides an integrated C4 interface as well as streamlined data display via an exemplary map engine such as National Aeronautics and Space Administration (NASA) World Wind Map Engine.

Additionally, in yet another embodiment, server 112 couples to and interfaces with an exemplary known Video Management System (VMS) that records, displays, and stores digital video data and associated metadata. The exemplary VMS may also include enhanced features such as metadata searching, digital video data streaming and remote digital video data playback. In various embodiments of the present disclosure, server 112, the GUI, and the VMS cooperate to at least partially form the above-mentioned comprehensive C4ISR system. Server 112, the GUI, and the VMS may also be configured such that each component is sufficiently modular wherein each component can operate independent of another component. For example, in one embodiment, server 112 may be configured to run/operate as a GUI-free application for real-time payload slewing (e.g. multiple gun-mounts point where a single camera/image acquisition device is directed to look toward/scan a particular location). Additionally, the GUI may be configured to run/operate as a stand-alone map engine such as, for example, Google Earth®. Lastly, the exemplary VMS may be configured to run/operate as a stand-alone system if a client/user has only video viewing and recording requirements.

As described above, computing device server 114 responds to user requests for data or access to one or more data files and application programs resident within server 114. In various embodiments, computing device sever 114 receives a plurality of data communications from command server 112 and shares the received data communications with plurality of computing devices 106A-C. In one embodiment, server 114 receives, from command server 112, personnel location information corresponding to one or more personnel in a first location and transmits/outputs/provides the received location information to computing devices 106A-C that are in a second location that is different from the first location. Hence, platform 200 and server 114 are configured to provide personnel position location information that is distributed throughout a network of computing devices 106 located at a remote location relative to command center 102. In one aspect of this embodiment, the location information provided to computing device server 114 by command server 112, may be stored in a memory/database within server 114 and then forwarded/transmitted out to at least one of the plurality of computing devices 106A-C. In another aspect of this embodiment, plurality of computing devices 106A-C are configured to communicate with server 112 through computing device server 114. In one embodiment, command server 112 and computing device server 114 are disposed in command center 102, are part of a Local Area Network (LAN), and are configured to exchange data communication by way of a wired or wireless Ethernet network connection.

Computing device server 114 generally includes hardware and software resources configured to host a plurality of application programs including, for example, a messaging/chat application, a spot report application, and a digital image/video acquisition application. In one embodiment, computing devices 106A-106C are configured to access and utilize one or more of the plurality of application programs hosted by computing device server 114. In another embodiment and as described in more detail in the disclosed embodiment of FIG. 3, computing devices 106A-106C may include one or more application programs that are stored in local memory within computing device 106. In this embodiment, because executable files associated with the application program(s) are resident within the device, computing device 106 may then utilize server 114 only for limited software and hardware resources to supplement functions and features of the locally stored application programs.

Computing platform 100 and, more particularly, computing platform 200 are generally configured to support personnel position location information (PPLI) needs such that personnel groups can operate on a wireless computing/information network that is independent of conventional wired networks or can operate in an environment where there are limited to no communication signals such as cellular or wireless. In one embodiment, computing platforms 100 and 200 allow computing devices 106A-C to exchange data communication with command center 102 via RAP 104. In this exemplary embodiment, computing devices 106 are portable platform clients that integrate with the EBRISS application in command center 102 and are configured to relay back a plurality of data communications to command center 102 such as location coordinates and information relating to personnel position location of friendly personnel and adversarial personnel. In one embodiment, location coordinates (latitude & longitude) relayed to command center 102 can be overlaid in the GUI such that command center personnel and EBRISS application users can see precisely where a person or people are positioned. In one embodiment, computing devices 106 include a data transmission limit of 1 Mega-Byte (MB) and provide data transmissions to command center 102 including SALUTE (Size, Activity, Location, Unit/Uniform, Time, and Equipment) reports, spot reports, chat messages, digital image files (pictures), digital video files, and PPLI. Hence, computing platform 100 and platform 200 may be utilized for purposes of exchanging a variety digital data communications, obtaining PPLI or keeping tabs, by command center 102, on a group of people assigned to complete a particular task or mission within a certain range of command center 102.

According to the present disclosure, the group may have one or more exemplary Android mobile operating system devices on their persons, such as computing devices 106A-C. As noted above, computing devices 106 are configured to communicably couple to and communicate with one or more radios 116 via a RAP 104 that is electronically coupled to a particular radio 116. As noted above, a radio 116 and its associated RAP 104 may be man-portable tactical software-defined combat-net radio devices. In one embodiment, radios 116 communicate with other Android/computing devices 106 via the Bluetooth communication protocol and communicate with command center 102 via TCP/IP. In this embodiment, radio 116A communicates with command center 102 by way of radio 116B (disposed within command center 102) and exchange data communications via RF signals that utilize TCP/IP to govern the flow of data. Command center 102 is therefore able to track and monitor the relative location of one more computing devices 106 (and the personnel associated with a particular computing device) when the devices 106 are generally within the signal access range of RAP 104A/B. As described in more detail in the disclosed embodiment of FIG. 3, computing devices 106 may programmed to be easily configurable and may further be programmed to automatically reconfigure as needed in response to the occurrence of a required software/hardware update.

In addition to providing PPLI back to command center 102, the present disclosure provides an exemplary computing platform that extends TCP/IP network capability out to the forward edge of a battlespace, rescue and/or operational environment using relatively inexpensive, lightweight gear and electronic devices that require relatively low power. Once the TCP/IP network is extended to the forward edge of the exemplary environment, other computing devices may be configured to "piggyback" or communicably couple onto the localized TCP/IP network. In one embodiment, the amount of data communications shared within the localized network is limited only by the bandwidth of the network connection. The use of Bluetooth rather than standard Wi-Fi communication protocols allows for low-power connections, which minimize power requirements, and also minimizes radio transmission signature (i.e. for tactical situations in which a low RF signature is desirable). In one embodiment of the present disclosure, a longer-range Bluetooth power setting may be used by RAP 104A/B to increase an exemplary signal access range limit associated with a particular RAP 104. In one aspect of this embodiment, computing devices 106A/B/C may also be configured such that a user can vary the power signals of the device's RF transceiver circuity at the expense of tactical/operational visibility. In this embodiment, an increase in the transceiver power signal provides, for example, additional Bluetooth signal range to transmit/receive PPLI and other information/data communications. In another embodiment, various other Bluetooth compatible devices for monitoring items and activities such as personnel health signs/indicators, radiation levels, and weather conditions may be paired/coupled to computing devices 106A/B/C. In this embodiment, information and other data communications associated with the items and activities may be exchanged between a computing device 106 and command center 102 via the aforementioned TCP/IP network connection.

Figure 3:
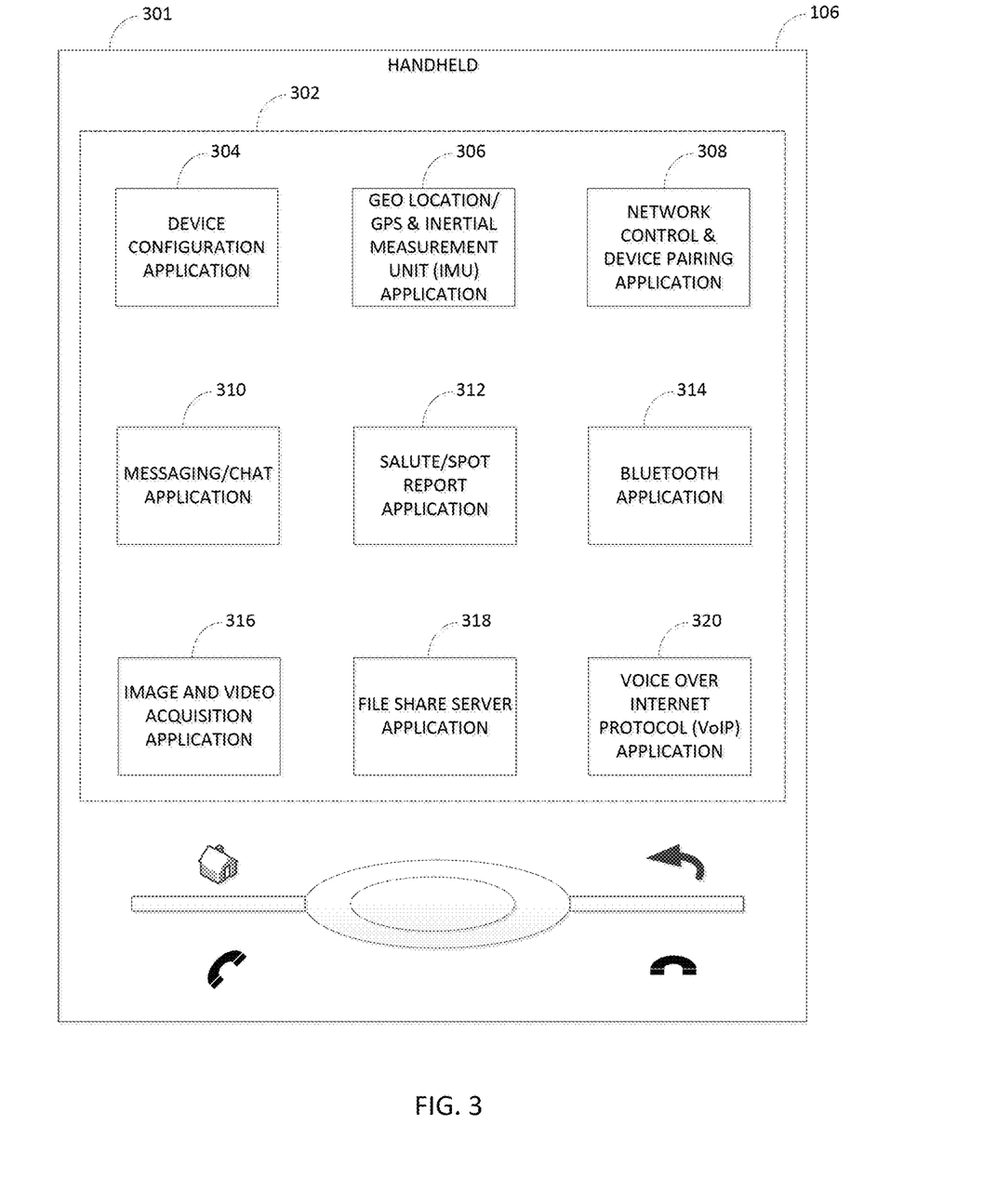
FIG. 3 is a block diagram depicting an application user interface of an exemplary computing device according to an embodiment of the present disclosure.

FIG. 3 is a block diagram depicting an application user interface of an exemplary computing device 106 according to an embodiment of the present disclosure. User Interface 301 (hereinafter "UI 301") generally includes a plurality of application programs 302 comprising a device configuration application 304, a geographic location/GPS & Internal Measurement Unit ("IMU") application 306, a network control & device pairing application 308, a message/chat application 310, a spot report application 312, a Bluetooth® application 314, an image and video acquisition application 316, a file share server application 318, and a Voice-over-Internet-Protocol (VoIP) application 320. With exception of device configuration application 304, the present disclosure contemplates that one of ordinary skill in the art of computing device application programming has general knowledge regarding design and implementation of the individual application programs that comprise programs 302. As such the present disclosure will provide only a brief description of each program that is already generally known in the art. As discussed briefly above, executable files for each of the plurality programs 302 may exist locally within memory resident on computing device 106 or, alternatively, may exist within computing device server 114 and accessed remotely by computing device 106. Device configuration application 304 is generally designed to execute one or more scripting algorithms (not shown) that, upon execution by the processor of computing device 106, automatically programs/configures the network settings of the computing device. In one embodiment, execution of the scripting algorithms configures the network settings to include one or more known Bluetooth access points such as, for example, RAP 104A and RAP 104B.

Geographic location/GPS & IMU application 306 is generally designed to provide (e.g. to command server 112 within command center 102) geographic location and GPS coordinates of one or more personnel located at a remote location relative to command center 102. In one embodiment, application 306 may be programed to cooperate with the internal GRAM-SAASM GPS receiver within radios 116A/C to determine/calculate geographic location and associated GPS coordinates for one or more personnel disposed at the remote location. In one aspect of this embodiment, the location data and/or GPS coordinates may be provided, for example, to command center 102 at a first time period when the one or more personnel are positioned at a first remote location that is spaced apart from command center 102 and provided again at a second time period when the one or more personnel are positioned at a second remote location that is spaced apart from the first remote location and that is also spaced apart from command center 102.

In one embodiment, computing device 106 includes an IMU (not shown) configured to measure and report an items specific force, angular rate/inertial movement, and sometimes the magnetic field surrounding the item, using a combination of accelerometers and gyroscopes, sometimes also magnetometers. In this one embodiment, computing device 106 may synchronize with radios 116A/C via a common synchronization clock and utilize application program 306 to report force and angular rate of movement to radios 116 at predetermined reporting intervals. In one embodiment, radios 116 may be configured to have at least one of a power save/listen communication mode and a burst communication mode. In power save mode, radios 116 listens for and/or receives data communications from computing device 106 indicating force and angular rate of movement of device 106. In this mode, force and movement data may be stored within local memory or an exemplary log file within radios 116 but not transmitted or provided to command server 112, except during the predetermined reporting intervals. In burst communication mode, radios 116 listens for and/or receives data communications from computing device 106 indicating force and movement of device 106 and transmits or provides the data to command server 112 in response to receiving the data.

In this embodiment, computing device 106 may utilize an alignment feature of the IMU to establish an initial or baseline force and movement profile with radios 116. After establishing the initial profile, computing device 106 may utilize the IMU to transmit updated force and movement data whenever computing device 106 moves beyond a predetermined threshold distance relative to the initial alignment profile. For example, computing device 106 may establish an initial alignment profile indicating that the device is approximately 5 ft away from radios 116. Computing device 106 may then be configured to provide updated force and movement data whenever the device's IMU determines that computing device 106 has moved more than 3 ft from its location indicated in its initial alignment profile. Hence, application 306 may cooperate with the internal GRAM-SAASM GPS receiver within radios 116 to automatically provide (e.g. to command server 112) location and GPS data of one or more personnel in response to movement of the personnel beyond a threshold distance relative to radios 116. Additionally, in one embodiment, a plurality of computing devices 106 may be communicably coupled together in a linear series manner (i.e. "daisy-chained") to mitigate any data transmission limitations of the Bluetooth communication protocol utilized by a single computing device interacting with radios 116. For example, in this embodiment, coupling three computing devices 106 in a series configuration extends the distance through which a single computing device may transmit position, force, and/or angular rate of movement data back to radios 116.

Network control & device pairing application 308 is generally designed to identify, for example, one or more RAPs 104 in close proximity to a particular computing device 106A/B/C. In one embodiment, application 308 facilitates communications coupling of computing device 106A to RAP 104A when computing device 106A is within range of or in sufficient proximity to the Bluetooth access signal range of RAP 104A. Likewise, if computing device 106A is not within range of or in sufficient proximity to the Bluetooth access signal range of RAP 104A but is within the Bluetooth access signal range of RAP 104B, application 308 may then identify RAP 104B as the best available access point, cause computing device 106A to decouple from RAP 104A, and establish communications coupling to RAP 104B. Message/chat application 310 is generally designed to provide conventional instant messaging/instant chat functionality between anyone of computing device 106A, 106B, 106C and command center 102. Hence, application 310 generally allows the exchange of text based data communications to occur between one or more computing devices 106 and between computing devices 106 and corresponding chat application accessible by a user within command center 102.

Spot report application 312 is generally designed to provide, for example, text based reports formatted to include information such as personnel Size, personnel Activity, personnel Location, personnel Unit/Uniform, Time, and personnel Equipment (i.e. SALUTE information) associated with one or more personnel groupings. Bluetooth® application 314 and image/video acquisition application 316 are conventional application programs generally known to the ordinary smart-phone user and provide Bluetooth device management and capturing/storing of digital pictures and video, respectively. In one embodiment, spot report application 312 may cooperate with image/video acquisition application 316 to provide text based reports formatted to include one or more digital images and/or digital videos depicting, for example, activities, units/uniforms, and equipment(s) associated with one or more groups of personnel. File share server application 318 and VoIP application 320 are conventional application programs generally known to one of ordinary skill in the art and provide data/file sharing, file access and file management and voice communications through Internet Protocol, respectively. As discussed above, ruggedized laptop 118 is generally configured to function as a file share server providing a central file share database including digital text data, image data, voice data, and video data storage for file access and sharing between one or more computing devices 106. Accordingly, in one embodiment, file share server application 318 allows a computing device 106 to access, download, and/or transfer one or more data files located within the file share server residing in the memory modules of ruggedized laptop 118.

Figure 4:
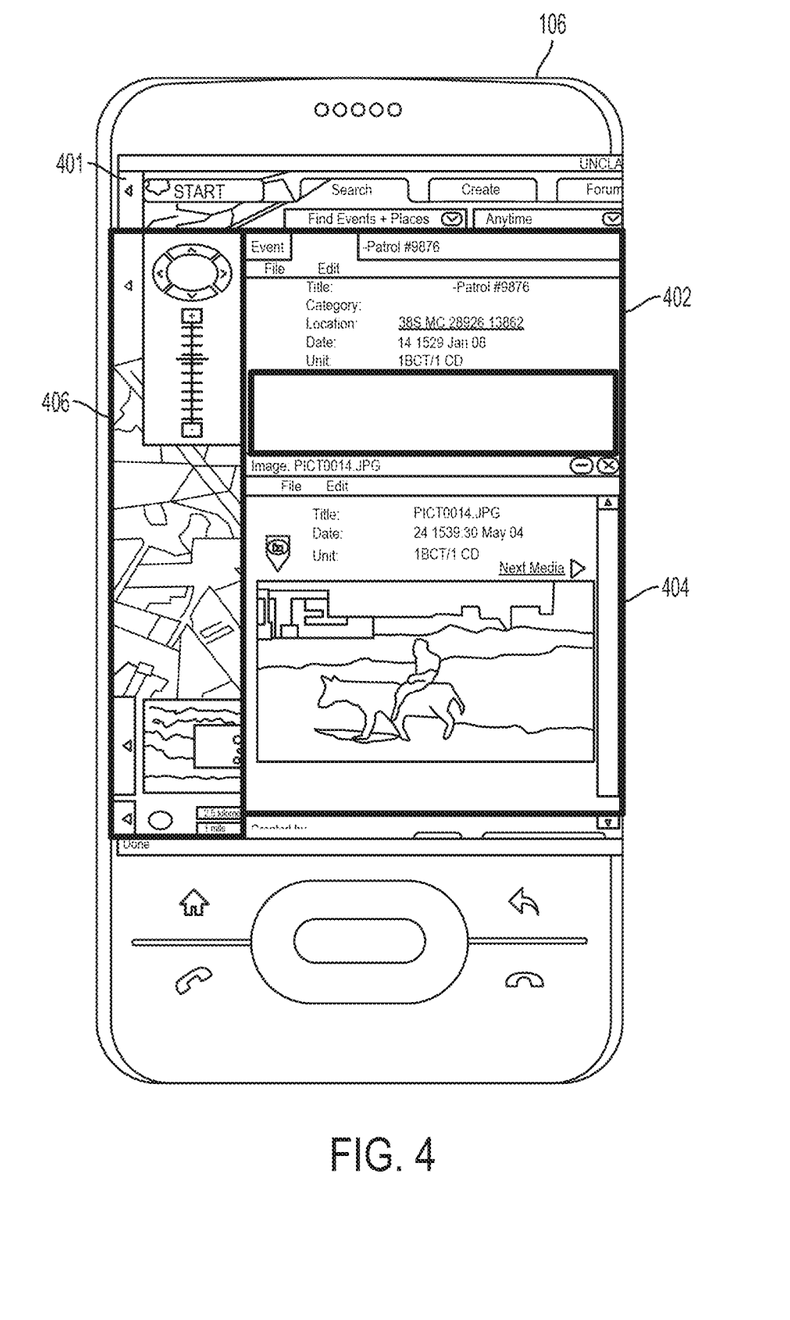
FIG. 4 shows an exemplary application user interface viewable on an exemplary computing device according to an embodiment of the present disclosure.

FIG. 4 shows an exemplary application user interface viewable on an exemplary computing device 106 according to an embodiment of the present disclosure. User Interface 401 (hereinafter "UI 401") generally corresponds to the block diagram UI 301 shown in the illustrative embodiment of FIG. 3. UI 401 generally includes UI section 402, UI section 404, UI section 406. In one embodiment, UI section 402 generally corresponds to spot report application 312 and shows an exemplary spot report/event corresponding to identification of a vehicle based improvised explosive device (VBIED), detected at a particular location (38S MC 28926 13862), occurring on a particular date (14 Jan. 8) and time (1529), and associated with a particular unit/uniform (1BCT/1 CD). In another embodiment, UI section 404 generally corresponds to image/video acquisition application 316 cooperating/integrating with spot report application 312 to provide text based reports formatted to include a digital image showing a particular individual, item and/or equipment associated with the event being reported. In yet another embodiment, UI section 406 generally corresponds to geographic location & GPS application 306 and shows an exemplary satellite image depicting a geographic location and associated GPS coordinates (e.g. 38S MC 28926 13862).

Figure 5:
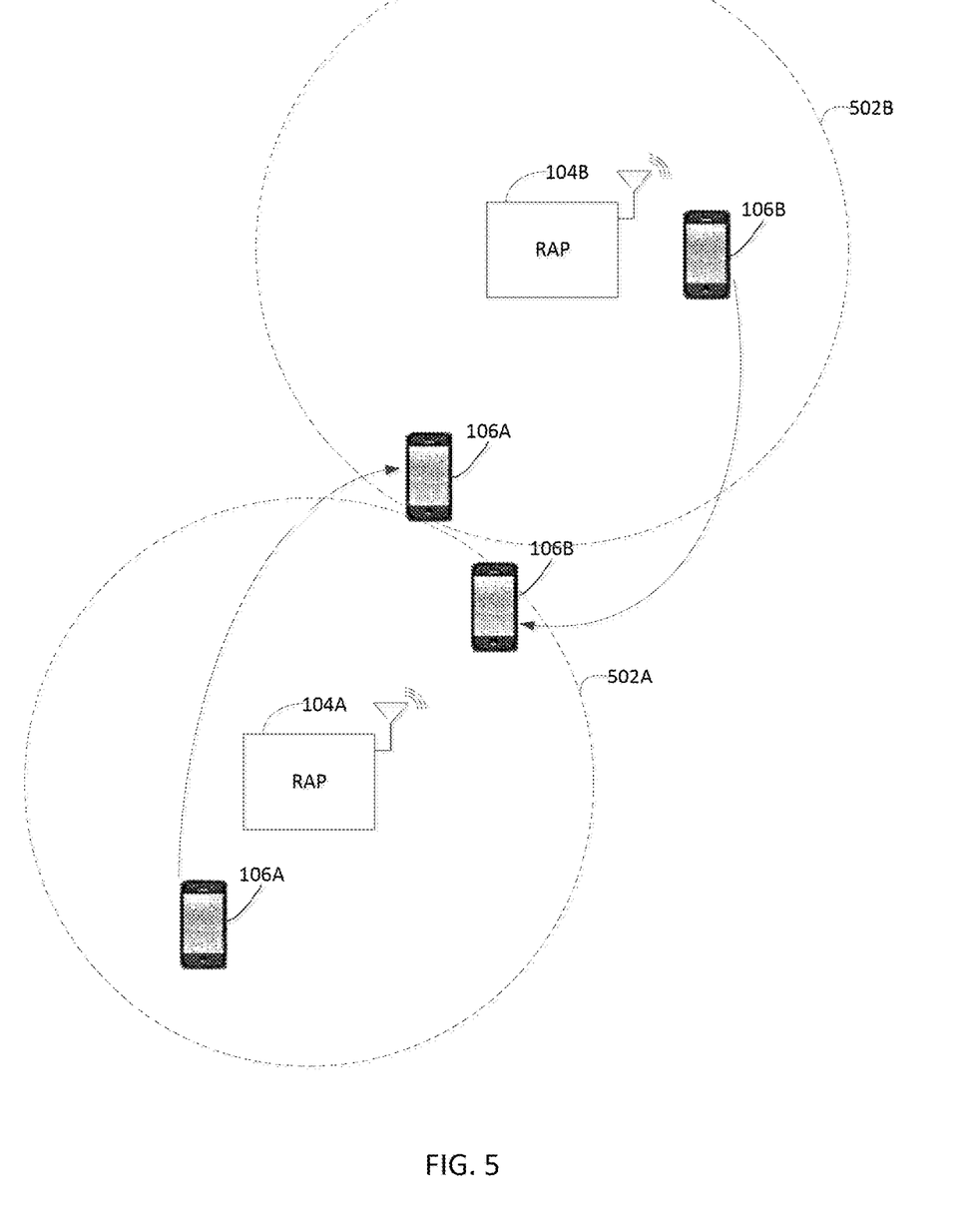
FIG. 5 is a diagram depicting an exemplary access signal range limit of one or more radio access points according to an embodiment of the present disclosure.

FIG. 5 is a diagram depicting an exemplary access signal range limit of one or more radio access points (e.g. RAP 104A/B) according to an embodiment of the present disclosure. The illustrative embodiment of FIG. 5 includes first access signal range limit 502A and second access signal range limit 502B. In one embodiment, range limit 502A indicates the scope/distance of the Bluetooth signal strength associated with RAP 104A while range limit 502B indicates the scope/distance of the Bluetooth signal strength associated with RAP 104B. As noted above, in one embodiment, network control & device pairing application 308 is generally designed to identify one or more RAPs 104A/B in close/sufficient proximity to a particular computing device 106A/B. In the illustrative embodiment of FIG. 5, application 308 facilitates communicably coupling computing device 106A to RAP 104A when the device is within sufficient proximity to access signal range limit 502A. However, as shown in FIG. 5, computing device 106A may also move beyond access signal range limit 502A. If this occurs, then application 308 will automatically decouple computing device 106A from RAP 104A and communicably couple computing device 106A to RAP 104B when the device is within sufficient proximity to access signal range limit 502B. Likewise, application 308 facilitates communicably coupling computing device 106B to RAP 104B when the device is within sufficient proximity to access signal range limit 502B. However, as shown in FIG. 5, computing device 106B may also move beyond access signal range limit 502B. If this occurs, then application 308 will automatically decouple computing device 106B from RAP 104B and communicably couple computing device 106B to RAP 104A when the device is within sufficient proximity to access signal range limit 502A.

Figure 6:
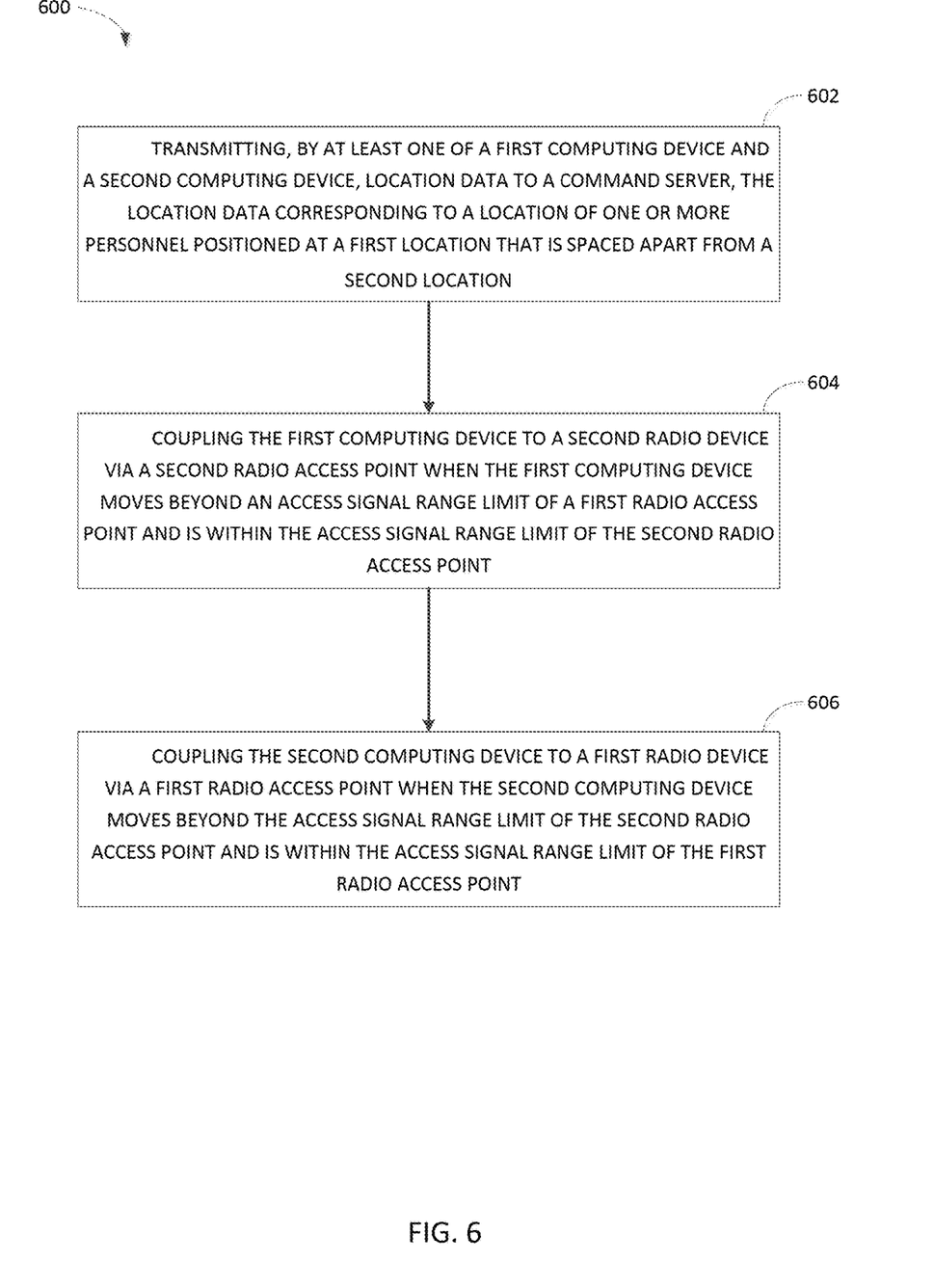
FIG. 6 is an exemplary flow diagram of a method of the computing platform of FIG. 1 and FIG. 2 according to an embodiment of the present disclosure.

FIG. 6 is an exemplary flow diagram of a method 600 of the computing platform of FIG. 1 and FIG. 2 according to an embodiment of the present disclosure. In various embodiments of the present disclosure, method 600 may be implemented and/or executed in computing platform 100 and computing platform 200. As such, a description of method 600 will reference the aforementioned components and devices of computing platform 100 and 200. Method 600 begins at block 602 and transmits, by at least one of a first computing device 106A and a second computing device 106B, location data to command center server 112, the location data corresponding to a location of one or more personnel positioned at a first location that is spaced apart from a second location. Method 600 then proceeds to block 604 and couples the first computing device 106A to a second radio device 116C via a second radio access point 104B when the first computing device 106A moves beyond an access signal range limit, such as access signal range limit 502A, of a first radio access point 104A and is within the access signal range limit, such as access signal range limit 502B, of the second radio access point 104B. Method 600 then proceeds to block 606 and couples second computing device 106B to a first radio device 116A via a first radio access point 104A when the second computing device 106B moves beyond the access signal range limit, such as access signal range limit 502B, of the second radio access point 104B and is within the access signal range limit, such as access signal range limit 502A, of the first radio access point 104A.

In the foregoing specification, specific embodiments of the present disclosure have been described. However, one of ordinary skill in the art will appreciate that various modifications and changes can be made without departing from the scope of the disclosure as set forth in the claims below. Accordingly, the specification and figures are to be regarded in an illustrative rather than a restrictive sense, and all such modifications are intended to be included within the scope of disclosure. The benefits, advantages, solutions to problems, and any element(s) that may cause any benefit, advantage, or solution to occur or become more pronounced are not to be construed as critical, required, or essential features or elements of any or all the claims. The disclosure is defined solely by the appended claims including any amendments made during the pendency of this application and all equivalents of those claims as issued. Although the invention has been described in detail with reference to certain preferred embodiments, variations and modifications exist within the spirit and scope of the invention as described and defined in the following claims.

The invention claimed is:

1. A computing platform, comprising:
   at least one computing device including a plurality of device applications;
   a command server disposed at a first location, wherein the command server is configured to provide data communication to the at least one computing device by way of a radio access point and to receive data communication from the at least one computing device by way of the radio access point;
   a first radio device communicably coupled to the at least one computing device and the command server, the first radio device being coupled to the radio access point to enable data communication between the at least one computing device and the command server; and
   wherein at least one device application enables the at least one computing device to transmit a plurality of data including location data and at least one of image data, text data, and voice data, the location data corresponding to a location of one or more personnel positioned at a second location that is spaced apart from the first location;
   wherein the at least one device application communicates with an inertial measurement unit of the at least one computing device to provide a first inertial movement data indicating a first position of the at least one computing device relative to the first radio device and to provide a second inertial movement data in response to the computing device moving beyond a threshold distance relative to the first position, the second inertial movement data indicating a second position of the at least one computing device relative to the first radio device; and
   wherein the location data is provided to the command server at a first time period when the one or more personnel are positioned at the second location and at a second time period when the one or more personnel are positioned at a third location that is spaced apart from the first location and the second location.

2. The computing platform of claim 1, wherein the command server is configured to transmit, to the at least one computing device, a plurality of data including location data and at least one of image data, text data, and voice data, the location data corresponding to a location of one or more personnel positioned at a fourth location that is spaced apart from the second location and the third location.

3. The computing platform of claim 1, wherein the at least one computing device couples to the radio access point and communicates with the first radio device by way of a first communication protocol.

4. The computing platform of claim 3, wherein the command server couples to the radio access point and communicates with the first radio device by way of a second communication protocol.

5. The computing platform of claim 4, wherein the first communication protocol is a Bluetooth communication protocol and the second communication protocol is a Transmission Control Protocol/Internet Protocol (TCP/IP).

6. The computing platform of claim 1, wherein the plurality of device applications includes at least one of an incident report application, a geographic location application, a data sharing server application, and a network control and device pairing application.

7. The computing platform of claim 6, wherein the location data is computed via the geographic location application and provided to the command server by the at least one computing device, the location data including at least a latitude coordinate and a longitude coordinate indicating a location of the one or more personnel.

8. The computing platform of claim 1, further including a second radio device disposed at the first location and intermediate the command server and the first radio device, the second radio device cooperates with the first radio device to enable data communication between the at least one computing device and the command server.

9. The computing platform of claim 5, wherein the at least one computing device, the radio access point, and the first radio device cooperate to form a secure personal area network ("PAN"), wherein the secure PAN utilizes a Bluetooth PAN that leverages E0 cryptography to couple the at least one computing device to the radio access point.

10. A computing platform, comprising:
a first computing device including a plurality of device applications, the first computing device configured to provide data communication by way of a first radio access point;
a command server disposed at a first location, the command server configured to provide data communication to the first computing device by way of the first radio access point and to receive data communication provided by the first computing device;
a first radio device communicably coupled to the first computing device, the first radio device being coupled to the first radio access point to enable data communication between the first computing device and the command server;
a second radio device communicably coupled to the command server and the first radio device, the second radio device being disposed at the first location and configured to enable data communication between the command server and the first computing device; and
wherein the first computing device couples to the first radio access point and communicates with the first radio device by way of a first communication protocol and wherein the first radio device couples to the second radio device and communicates with the second radio device by way of a second communication protocol;
wherein at least one device application enables the first computing device to transmit a plurality of data including location data and at least one of image data, text data, and voice data, the location data corresponding to a location of one or more personnel positioned at a second location that is spaced apart from the first location; and
wherein the at least one device application communicates with an inertial measurement unit of the first computing device to provide a first inertial movement data indicating a first position of the first computing device relative to the first radio device and to provide a second inertial movement data in response to the computing device moving beyond a threshold distance relative to the first position, the second inertial movement data indicating a second position of the first computing device relative to the first radio device.

11. The computing platform of claim 10, wherein the location data is provided to the command server at a first time period when the one or more personnel are positioned at the second location and at a second time period when the one or more personnel are positioned at a third location that is spaced apart from the first location and the second location.

12. The computing platform of claim 10, wherein the first communication protocol is a Bluetooth communication protocol and the second communication protocol is a Transmission Control Protocol/Internet Protocol (TCP/IP).

13. The computing platform of claim 10, wherein the at least one device application enables the computing device to transmit the voice data by way of a Voice-over-Internet Protocol (VoIP).

14. The computing platform of claim 10, further including a third radio device and a second computing device configured to communicably couple to at least one of the first radio device and the third radio device, the third radio device being coupled to a third radio access point to enable data communication between the second computing device and the command server.

15. The computing platform of claim 14, wherein the first radio access point and the third radio access point each have an access signal range limit and the first computing device decouples from the first radio device and couples to the third radio device via the third access point when the first computing device moves beyond the access signal range limit of the first radio access point and is within the access signal range limit of the third radio access point.

16. The computing platform of claim 15, wherein the second computing device decouples from the third radio device and couples to the first radio device via the first radio access point when the second computing device moves beyond the access signal range limit of the third radio access point and is within the access signal range limit of the first radio access point.

17. The computing platform of claim 12, wherein the first computing device, the first radio access point, and the first radio device cooperate to form a secure personal area network ("PAN"), wherein the secure PAN utilizes a Bluetooth PAN that leverages E0 cryptography to couple the first computing device to the first radio access point.

18. A method in a computing platform, comprising:
providing a first wireless communication link between a first computing device and at least one of a first radio device disposed at a first location and a second radio device disposed at a second location that is spaced apart from the first location;
providing a second wireless communication link between a second computing device and at least one of the first radio device and second radio device;
providing a third wireless communication link between a command server and at least one of the first radio device and the second radio device, the command server being disposed at a third location that is spaced apart from the first and second locations;
providing a first radio access point having a first access signal range limit, the first radio access point enabling data communication between the command server and at least the first computing device;
providing a second radio access point having a second access signal range limit, the second signal access point enabling data communication between the command server and at least the second computing device;

transmitting, by at least one of the first and second computing devices, a plurality of data to the command server, the plurality of data including location data and at least one of image data, text data, and voice data, the location data corresponding to a location of one or more personnel positioned at a fourth location that is spaced apart from the third location;

coupling the first computing device to the second radio device via the second radio access point when the first computing device moves beyond the access signal range limit of the first radio access point and is within the access signal range limit of the second radio access point; and coupling the second computing device to the first radio device via the first radio access point when the second computing device moves beyond the access signal range limit of the second radio access point and is within the access signal range limit of the first radio access point.

19. The method of claim 18, wherein the first wireless communication link includes a first communication protocol and the second wireless communication link includes a second communication protocol that is distinct from the first communication protocol.

20. The method of claim 19, wherein the first communication protocol is a Bluetooth communication protocol and the second communication protocol is a Transmission Control Protocol/Internet Protocol (TCP/IP).

21. The method of claim 20, wherein transmitting includes providing the location data to the command server at a first time period when the one or more personnel are positioned at the fourth location and at a second time period when the one or more personnel are positioned at a fifth location that is spaced apart from the fourth location and the third location.

22. The method of claim 18, further including transmitting, by the command server, a plurality of data to at least one of the first and second computing devices, the plurality of data including location data and at least one of image data, text data, and voice data, the location data corresponding to a location of one or more personnel positioned at a sixth location that is spaced apart from at least the fifth and fourth locations.

23. The method of claim 18, wherein the first and second computing devices each include a plurality of device applications wherein at least one device application enables the first and second computing devices to transmit the voice data, wherein the voice data is transmitted by way of a Voice-over-Internet Protocol (VoIP).

24. The method of claim 23, wherein the plurality of device applications includes at least one of an incident report application, a geographic location application, a data sharing server application, and a network control and device pairing application.

25. The method of claim 24, wherein the location data is computed via the geographic location application and provided to the command server by at least one of the first and second computing devices, the location data including at least a latitude coordinate and a longitude coordinate indicating a location of the one or more personnel.

26. The method of claim 20, wherein the first and second computing devices, the first and second radio access points, and the first and second radio devices cooperate to form a secure personal area network ("PAN"), wherein the secure PAN utilizes a Bluetooth PAN that leverages E0 cryptography to couple the first and second computing devices to the first radio access point and to couple the first and second computing devices to the second radio access point.

27. A computing platform, comprising:

a first computing device including a plurality of device applications, the first computing device configured to provide data communication by way of a first radio access point;

a command server disposed at a first location, the command server configured to provide data communication to the first computing device by way of the first radio access point and to receive data communication provided by the first computing device;

a first radio device communicably coupled to the first computing device, the first radio device being coupled to the first radio access point to enable data communication between the first computing device and the command server;

a second radio device communicably coupled to the command server and the first radio device, the second radio device being disposed at the first location and configured to enable data communication between the command server and the first computing device;

wherein the first computing device couples to the first radio access point and communicates with the first radio device by way of a first communication protocol and wherein the first radio device couples to the second radio device and communicates with the second radio device by way of a second communication protocol;

wherein at least one device application enables the first computing device to transmit a plurality of data including location data and at least one of image data, text data, and voice data, the location data corresponding to a location of one or more personnel positioned at a second location that is spaced apart from the first location;

wherein the at least one device application communicates with an inertial measurement unit of the first computing device to provide a first inertial movement data indicating a first position of the first computing device relative to the first radio device and to provide a second inertial movement data in response to the computing device moving beyond a threshold distance relative to the first position, the second inertial movement data indicating a second position of the first computing device relative to the first radio device;

wherein the location data is provided to the command server at a first time period when the one or more personnel are positioned at the second location and at a second time period when the one or more personnel are positioned at a third location that is spaced apart from the first location and the second location;

wherein the first communication protocol is a Bluetooth communication protocol and the second communication protocol is a Transmission Control Protocol/Internet Protocol (TCP/IP); and wherein the at least one device application enables the computing device to transmit the voice data by way of a Voice-over-Internet Protocol (VoIP); and a third radio device and a second computing device configured to communicably couple to at least one of the first radio device and the third radio device, the third radio device being coupled to a third radio access point to enable data communication between the second computing device and the command server;

wherein the first radio access point and the third radio access point each have an access signal range limit and the first computing device decouples from the first radio device and couples to the third radio device via the third access point when the first computing device moves beyond the access signal range limit of the first radio access point and is within the access signal range limit of the third radio access point; and wherein the second computing device decouples from the third radio device and couples to the first radio device via the first radio access point when the second computing device moves beyond the access signal range limit of the third radio access point and is within the access signal range limit of the first radio access point.

* * * * *